A. E. VAN HORN & J. WIDEMAN.
Vehicle Seat-Lock.

No. 162,590. Patented April 27, 1875.

WITNESSES:
C. Neveux

INVENTOR:
A. E. Van Horn
BY J. Wideman
ATTORNEYS.

THE GRAPHIC CO. PHOTO-LITH. 39 & 41 PARK PLACE, N.Y.

UNITED STATES PATENT OFFICE.

ALBERT E. VAN HORN AND JOSEPH WIDEMAN, OF SEBEWAING, MICH.

IMPROVEMENT IN VEHICLE-SEAT LOCKS.

Specification forming part of Letters Patent No. 162,590, dated April 27, 1875; application filed March 13, 1875.

*To all whom it may concern:*

Figure 1:
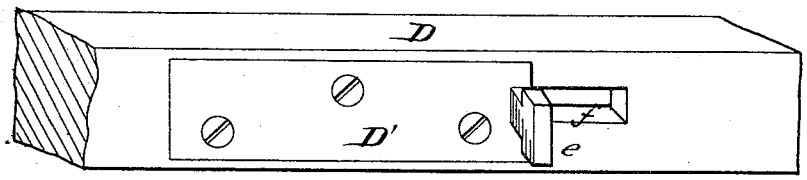
Figure 2:
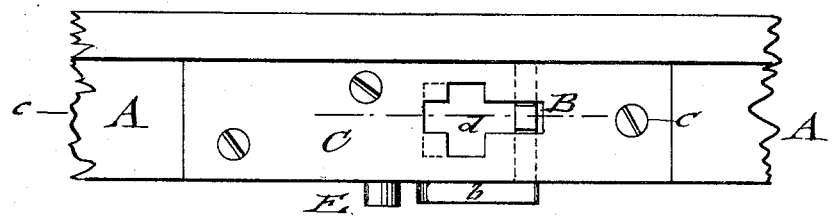
Figure 3:
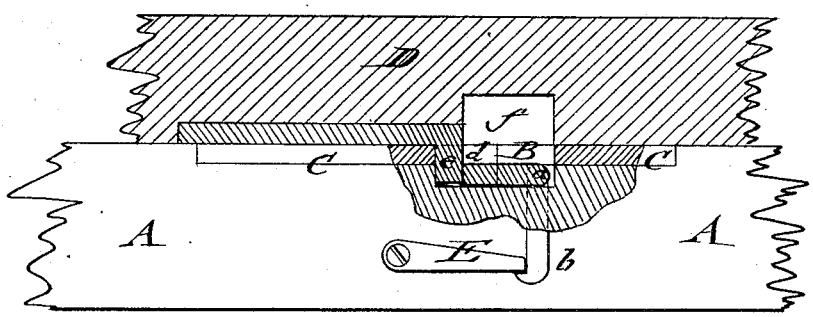

Be it known that we, ALBERT E. VAN HORN and JOSEPH WIDEMAN, of Sebewaing, in the county of Huron and State of Michigan, have invented a new and Improved Wagon-Seat Lock, of which the following is a specification:

In the accompanying drawing, Figure 1 represents a perspective view of the seat-block; Fig. 2, a top view of the side board of the wagon or carriage body; Fig. 3, a vertical longitudinal section on the line $c\ c$, Fig. 2, showing seat attached to body; and Fig. 4, a perspective view of the pivoted seat-locking key detached.

Similar letters of reference indicate corresponding parts.

Our invention relates to a simple and durable device for locking rigidly and securely the seats to carriage, wagon, or other vehicle bodies; and it consists of a pivoted dog or key of the side board, that is thrown against a T-shaped piece of the seat-block, binding it securely into the recessed top plate of the side board, a pivoted pawl securing the dog in locked position by engaging the outer cleat of the same.

Figure 4:
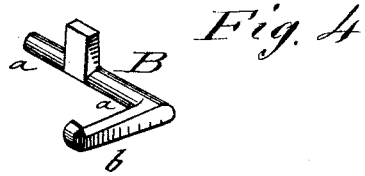

In the drawing, A represents the side board of any vehicle, to which is applied, into a suitable recess, the dog or key B, constructed as shown in detail in Fig. 4, with a round dog-carrying pivot-rod, $a$, and an arm or cleat, $b$, with projection or hook at the outer end. The dog B is secured by a screw-fastened top plate, C, in the side board, swinging readily in horizontal position on its pivot-rod, while projecting, when in unlocked position, through a cross-shaped recess, $d$, of the binding top plate C. The seat is provided at its base piece or block D with a screw-plate, D′, provided with a T-shaped projecting lug, $e$, that fits into the lateral part of recess $d$ of the top plate C, while the projecting dog B enters at the same time a recess, $f$, of the seat-block D, back of lug $e$.

When the seat is thus placed on the side boards of the body, the bolt is swung down by the outer arm or cleat, so as to carry the T-shaped lug forward into the front part of recess $d$ of the top plate, engaging by the side shoulders of the lug, the lower part of the top plate to be then rigidly secured in this position by the key binding against the rear part of the lug, as shown in Fig. 3.

The dog B is furthermore secured in this position by a pivoted pawl, E, that is thrown on the hook end or projection of cleat $b$, so as to furnish no opportunity to the dog or seat to play loose by the jars and vibrations of the body.

The lock is made of solid, cheap, and durable parts, which are not liable to get out of order, and admit the instant detaching of the seat by releasing the pawls from the keys, swinging the same back, and sliding out the binding lugs of the seat-blocks from the recessed top plate.

Having thus described our invention, we claim as new and desire to secure by Letters Patent—

The combination, with a T-shaped lug attached to and projecting from the recessed seat block or riser D, of the pivoted dog B and pawl or locking device E, both attached to the side board A, as shown and described.

ALBERT EUGENE VAN HORN.
JOSEPH WIDEMAN.

Witnesses:
JACOB SPRIESS,
MARTIN LINK.